United States Patent Office 3,641,050
Patented Feb. 8, 1972

3,641,050
1,5-SUBSTITUTED INDAZOLES
Pasquale Paul Minieri, Woodside, N.Y., assignor to Tenneco Chemicals, Inc.
No Drawing. Filed Dec. 12, 1967, Ser. No. 689,812
Int. Cl. C07d 49/18
U.S. Cl. 260—310 C        5 Claims

ABSTRACT OF THE DISCLOSURE 1,5-substituted indazoles having the structural formula

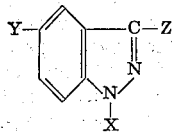

wherein X represents —CH$_2$X',

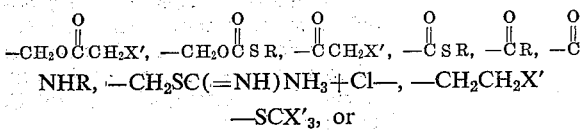

—NHR, —CH$_2$SC(=NH)NH$_3$+Cl—, —CH$_2$CH$_2$X'

—SCX'$_3$, or $$-\overset{O}{\underset{\|}{P}}=(OR)_2$$

X' represents —OH, —OR, —SCN, halogen, or piperidino; R represents an alkyl, haloalkyl, phenyl, or substituted phenyl group; Y represents chlorine, nitro, or amino; and Z represents hydrogen or halogen, are used to control the growth of undesirable fungi, plants, and insects. Among the most active of these compounds as pesticides are N'-hydroxymethyl-5-chloroindazole, 2-(5-chloroindazolylmethyl) thiourea hydrochloride, N'-thiocyanatomethyl-5-nitroindazole, and N' - trichloromethylmercapto-3,5-dichloroindazole.

---

This invention relates to novel biocidal compounds and to their use in the control of various plant and animal pests. More particularly, it relates to the control of the growth of undesirable fungi, plants, and insects using pesticidal compositions that contain certain 1,5-substituted indazoles as their biocidally-active ingredients.

In accordance with this invention, it has been discovered that certain 1,5-substituted indazoles have unusual and valuable activity as fungicides, insecticides, and selective herbicides. These compounds may be represented by the structural formula

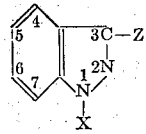

wherein X represents —CH$_2$X',

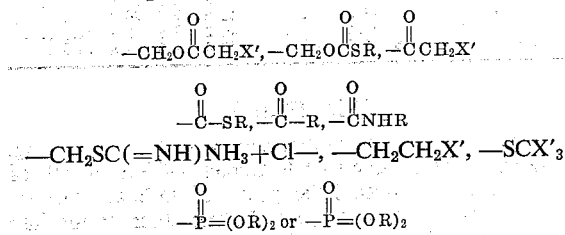

—CH$_2$SC(=NH)NH$_3$+Cl—, —CH$_2$CH$_2$X', —SCX'$_3$ $$-\overset{O}{\underset{\|}{P}}=(OR)_2 \text{ or } -\overset{O}{\underset{\|}{P}}=(OR)_2$$

X' represents —OH, —OR, —SCN, —Cl, —Br, —F, —I, or piperidino; R represents an alkyl group having 1 to 12 carbon atoms, a haloalkyl group having 1 to 4 carbon atoms, phenyl, chlorophenyl, hydroxyphenyl, alkylphenyl, or nitrophenyl; Y represents chlorine, nitro, or amino; and Z represents hydrogen, chlorine, bromine, fluorine, or iodine. The preferred compounds for use in pesticidal compositions are those in which Y is chlorine or nitro and Z is hydrogen or chlorine.

Illustrative of the pesticidal compounds of this invention are the following:

N'-hydroxymethyl-5-chloroindazole,
N'-trichloromethylmercapto-5-chloroindazole,
N'-carbothiolethoxy-5-chloroindazole,
N'-thiocyanatomethyl-5-chloroindazole,
N'-(N-n-butylcarbamoyl)-5-chloroindazole,
N'-(3,4-dichlorobenzoyl)-5-chloroindazole,
N'-(5-chloroindazolyl)methylethylthiol carbamate,
N'-chloroacetoxymethyl-5-chloroindazole,
N'-piperidinomethyl-5-chloroindazole,
2-(5-chloroindazolylmethyl)thiourea hydrochloride,
N'-(2-hydroxyethyl)-5-chloroindazole,
diethyl N'-(5-chloroindazolyl)amido phosphate,
N'-hydroxymethyl-5-nitroindazole,
N'-carbothiolethoxy-5-nitroindazole,
N'-trichloromethylmercapto-5-nitroindazole,
N'-(3-nitrobenzoyl)-5-nitroindazole,
N'-thiocyanatomethyl-5-nitroindazole,
(N'-5-nitroindazolyl)methylethylthiol carbonate,
N'-trichloromethylmercapto-3,5-dichloroindazole,
N'-(4-hydroxybenzoyl)-3,5-dichloroindazole,
N'-hydroxymethyl-3,5-dichloroindazole,
N'-trichloromethylmercapto-3-chloro-5-nitroindazole,
N'-hydroxymethyl-3-chloro-5-nitroindazole,
N'-chloroacetoxy-3-chloro-5-nitroindazole,
N'-(2-hydroxyethyl)-3-chloro-5-nitroindazole,
and the like.

A single 1,5-substituted indazole or a mixture of two or more of these compounds may be present in the pesticidal compositions of this invention.

The substituted indazoles of this invention may be prepared by any suitable and convenient procedure. For example, a 5-substituted indazole or a 3-halo-5-substituted indazole may be heated as such or as its N'-amine salt with a compound that will react with it to form the desired 1,5-substituted indazole. Thus, 5-chloroindazole or 3-chloro-5-nitroindazole may be heated with paraformaldehyde to form the corresponding N'-hydroxymethyl compounds or with trichloromethylsulfenyl chloride to form the corresponding N'-trichloromethylmercapto compounds. The reaction is generally carried out in a solvent, such as benzene, toluene, xylene, acetone, pyridine, ethanol, or ethylene dichloride, at the reflux temperature of the reaction mixture.

The biocidal compositions of this invention may be applied to a wide variety of fungi, plants, insects, and other pests to control or inhibit their growth. While each of the substituted indazoles has been found to be useful in the control of the growth of at least one of the aforementioned types of organisms, the particular pest upon which each exerts its major effect is largely dependent upon the substituents on the rings. For example, N'-(2-hydroxyethyl)-5-chloroindazole is most effective as a selective herbicide, while N'-thiocyanatomethyl-5-nitroindazole is most effective as a foliar fungicide and N'-piperidinomethyl-5-chloroindazole as a soil fungicide.

The locus in which pest control is to be effected may, if desired, be treated with the compounds of this invention. Alternatively, the compounds may be applied directly to the undesirable organisms to control or inhibit their growth.

While the 1,5-substituted indazoles may be used as such in the processes of this invention, they are usually and preferably used in combination with an inert carrier that facilitates the dispensing of dosage quantities of the pesticide and assists in its absorption by the organism whose growth is to be controlled. The pesticidal compounds may be mixed with or deposited upon inert particulate solids, such as fullers earth, talc, diatomaceous earth, hydrated calcium silicate, kaolin, and the like, to form dry particulate compositions. Such compositions may, if desired, be dispersed in water with or without the aid of a surface-active agent. The pesticidal compounds are preferably dispensed in the form of solutions or dispersions in inert organic solvents, water, or mixtures of inert organic solvents and water or as oil-in-water emulsions. The concentration of the pesticide in the compositions may vary within wide limits and depends upon a number of factors, the most important of which are the type or types of organisms being treated and the rate at which the composition is to be applied. In most cases the composition contains approximately 0.1 percent to 85 percent by weight of one or more of the aforementioned substituted indazoles. If desired, the compositions may also contain other fungicides, such as sulfur, the metal dimethyl dithiocarbamates, and the metal ethylene bis-(dithiocarbamates); insecticides, such as chlordane, benzene hexachloride, and DDT; or plant nutrients, such as urea, ammonium nitrate, and potash.

The amount of the composition used is that which will bring about satisfactory control of the growth of the organism. To achieve control of fungi and insects, for example, an amount of the composition that is used is that which will apply to the locus or to the organism about 50 p.p.m. to 10,000 p.p.m. of the active compound since these amounts will ordinarily control the pest without injuring plants. Herbicidal compositions are generally used in amounts that will apply about 1 pound to 20 pounds of the active compound per acre.

The invention is further illustrated by the examples that follow.

EXAMPLE 1

A mixture of 45 grams (0.296 mole) of 5-chloroindazole, 11.1 grams (0.369 mole) of paraformaldehyde, 200 ml. of ethanol, and 2.3 ml. of 5% aqueous sodium hydroxide solution was heated at its reflux temperature for 2.75 hours, cooled, and filtered. The solid product was washed with ethanol and dried. There was obtained a 73 percent yield of N'-hydroxymethyl-5-chloroindazole, which melted at 126°–126.5° C. and which contained 19.1 percent Cl and 15.3 percent N (calculated, 19.4 percent Cl and 15.1 percent N).

EXAMPLE 2

To a mixture of 30.5 grams (0.2 mole) of 5-chloroindazole, 22 grams (0.2 mole) of triethylamine, and 250 ml. of benzene which was being heated at its reflux temperature was added over a period of 45 minutes 39.8 grams (0.2 mole) of trichloromethanesulfenyl chloride and 250 ml. of benzene. The resulting mixture was heated at its reflux temperature for 1.25 hours, cooled to room temperature, and filtered. The filtrate was washed with two 100 ml. portions of water and then heated to remove the benzene. There was obtained a 58 percent yield of N'-trichloromethylmercapto-5-chloroindazole which melted at 82°–88° C. and which contained 9.0 percent N, 45.8 percent Cl, and 9.2 percent S (calculated, 8.7 percent N, 47.0 percent Cl, and 10.6 percent S).

EXAMPLE 3

To a mixture of 30.5 grams (0.2 mole) of 5-chloroindazole, 20.2 grams (0.2 mole) of triethylamine, and 300 ml. of benzene which had been heated to its reflux temperature was added over a period of one hour 25.5 grams (0.2 mole) of ethyl thiol formate and 25 ml. of benzene. The mixture was heated at its reflux temperature for 3 hours, cooled to room temperature, and filtered. The filtrate was washed with two 100 ml. portions of water and then heated to remove the benzene. The product was recrystallized from petroleum ether. The N'-carbothiolethoxy-5-chloroindazole obtained melted at 129.5°–130.5° C. and contained 49.9 percent C, 3.7 percent H, and 11.6 percent N (calculated, 49.9 percent C, 3.7 percent H, and 11.6 percent N).

EXAMPLE 4

A mixture of 41 grams (0.2 mole) of N'-chloromethyl-5-chloroindazole, 19.8 grams (0.2 mole) of potassium thiocyanate, and 435 ml. of acetone was heated at its reflux temperature for 3 hours and then heated to remove the acetone. The N'-thiocyanatomethyl-5-chloroindazole obtained melted at 135°–145° C. and contained 16.9 percent N (calculated, 17.9 percent N).

EXAMPLE 5–30

The following 1,5-substituted indazoles were prepared by the procedures set forth in Examples 1–4.

| Example No. | Compound | Melting range (° C.) | Calculated | | | | | Found | | | | |
|---|---|---|---|---|---|---|---|---|---|---|---|---|
| | | | C | H | N | Cl | S | C | H | N | Cl | S |
| 5 | N'-(N-n-butylcarbamoyl)-5-chloroindazole | | 57.2 | 5.6 | 16.7 | 14.1 | | 57.0 | 5.6 | 16.5 | 13.7 | |
| 6 | N'-(3,4-dichlorobenzoyl)-5-chloroindazole | 182.5–183.5 | 51.6 | 2.2 | 8.6 | 32.7 | | 51.0 | 2.8 | 9.3 | 31.7 | |
| 7 | N'-(5-chloroindazolyl)-methyethylthiol carbonate | 73–76.5 | 48.9 | 4.1 | 10.6 | 13.1 | | 50.1 | 4.1 | 11.2 | 14.1 | |
| 8 | N'-chloroacetoxymethyl-5-chloroindazole | 98.5–100.5 | 46.3 | 3.1 | 10.8 | 27.4 | | 45.0 | 3.1 | 11.6 | 29.0 | |
| 9 | N'-piperidinomethyl-5-chloroindazole | 104–105 | | | 16.1 | 14.2 | | | | 16.1 | 13.6 | |
| 10 | 2-(5-chloroindazolylmethyl)thiourea.HCl | 165–170 | | | 20.3 | | | | | 20.9 | | |
| 11 | N'-trichloromethylmercapto-5-nitroindazole | 151–153 | | | | 34.1 | | | | | 32.8 | |
| 12 | N'-(3,4-dichlorophenylcarbamoyl)-5-chloroindazole | 194–196 | 49.4 | 2.4 | 12.3 | 31.2 | | 48.7 | 2.4 | 12.1 | 30.9 | |
| 13 | N'-(2-hydroxyethyl)-5-chloroindazole | (1) | 55.2 | 4.6 | 14.3 | 18.0 | | 52.8 | 4.5 | 13.9 | 18.0 | |
| 14 | Diethyl N'-(5-chloroindazolyl)amido phosphate | (1) | 50.7 | 5.4 | 10.8 | 13.6 | | 45.8 | 5.2 | 9.4 | 11.8 | |
| 15 | N'-chloroacetyl-5-chloroindazole | 137.5–140 | 47.7 | 2.7 | 12.2 | 31.0 | | 47.6 | 3.0 | 12.2 | 30.4 | |
| 16 | N'-hydroxymethyl-5-nitroindazole | 152–155 | | | 21.8 | | | | | 21.5 | | |
| 17 | N'-carbothiolethoxy-5-nitroindazole | 138–142 | 47.8 | 3.6 | 16.7 | | 12.7 | 47.8 | 3.5 | 16.7 | | 12.6 |
| 18 | N'-piperidinomethyl-5-nitroindazole | 106–114 | 52.8 | 5.1 | 19.0 | | | 54.9 | 5.2 | 20.1 | | |
| 19 | N'-thiocyanatomethyl-5-nitroindazole | 100–115 | 46.2 | 2.6 | 23.9 | | 13.7 | 44.9 | 2.6 | 23.7 | | 13.5 |
| 20 | (N'-5-nitroindazolyl)methylethylthiol carbonate | 93–101 | 47.0 | 3.9 | | | 11.4 | 47.9 | 4.3 | | | 11.2 |
| 21 | 2-(5-nitroindazolylmethyl)thiourea.HCl | 2 207 | | | 25.4 | | 11.6 | | | 24.9 | | 11.4 |
| 22 | N'-trichloromethylmercapto-3,5-dichloroindazole | 86–89 | 28.6 | 0.9 | 8.3 | 52.5 | 9.5 | 29.7 | 1.5 | 8.7 | 51.0 | 9.8 |
| 23 | N'-hydroxymethyl-3,5-dichloroindazole | 155–157.5 | 44.2 | 2.8 | | 32.7 | | 43.9 | 3.0 | | 32.3 | |
| 24 | N'-(3,4-dichlorobenzoyl)-3,5-dichloroindazole | 167–170 | 46.7 | 1.7 | 7.8 | 40.0 | | 47.4 | 1.6 | 7.9 | 40.3 | |
| 25 | N'-trichloromethylmercapto-3-chloro-5-nitroindazole | 110–115 | | | 12.1 | | 9.2 | | | 13.2 | | 9.1 |
| 26 | N'-carbothiolethoxy-3-chloro-5-nitroindazole | 133–135 | 41.9 | 2.8 | | | | 42.1 | 3.2 | | | |
| 27 | N'-hydroxymethyl-3-chloro-5-nitroindazole | 137–141 | 42.3 | 2.6 | 18.4 | | | 43.3 | 2.8 | 19.1 | | |
| 28 | N'-chloroacetoxy-3-chloro-5-nitroindazole | 105–110 | 39.5 | 2.3 | 23.3 | | | 42.0 | 2.4 | 20.2 | | |
| 29 | N'-(2-hydroxyethyl)-3-chloro-5-nitroindazole | 100–113 | 44.7 | 3.8 | 17.4 | 14.7 | | 46.2 | 3.8 | 19.1 | 12.6 | |
| 30 | N'-(3,4-dichlorobenzoyl)-3-chloro-5-nitroindazole | 224–234 | 45.4 | 1.6 | 11.3 | 28.7 | | 47.4 | 1.6 | 11.8 | 26.3 | |

[1] Oil.  [2] Dec.

EXAMPLE 31

Acetone solutions were prepared by dissolving 100 mg. portions of the products of Examples 1–30 in 10 ml. of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the 1,5-substituted indazole. More dilute solutions were prepared by adding distilled water to these solutions.

EXAMPLE 32

A series of tests was carried out in which the 1,5-substituted indazoles were evaluated as selective herbicides.

disease was noted. In no case was there appreciable injury to the plants. The results obtained are summarized in Table III.

TABLE I.—ACTIVITY OF 1,5-SUBSTITUTED INDAZOLES AS SELECTIVE HERBICIDES

| Herbicide, product of— | Rate (lbs./acre) | Clover | Soy bean | Sugar beet | Cotton | Corn | Oats | Mustard | Morning glory | Buckwheat | Rye grass | Crab-grass | Foxtail |
|---|---|---|---|---|---|---|---|---|---|---|---|---|---|
| Example 1 | 10 | 3 | 5 | 4 | 3 | 2 | 2 | 5 | 4 | 4 | 1 | 1 | 1 |
| Example 4 | 10 | 4 | 5 | 3 | 4 | 0 | 2 | 4 | 2 | 2 | 2 | 0 | 0 |
| Example 5 | 20 | 4 | 3 | 5 | 3 | 3 | 4 | 4 | 3 | 4 | 4 | 5 | 3 |
|  | 10 | 3 | 2 | 3 | 2 | 2 | 3 | 3 | 2 | 3 | 1 | 3 | 3 |
| Example 8 | 20 | 4 | 3 | 3 | 3 | 2 | 2 | 4 | 2 | 3 | 1 | 2 | 1 |
|  | 10 | 5 | 3 | 5 | 3 | 3 | 4 | 5 | 4 | 4 | 4 | 5 | 4 |
| Example 11 | 5 | 2 | 3 | 3 | 3 | 2 | 2 | 5 | 3 | 2 | 2 | 4 | 2 |
|  | 20 | 5 | 5 | 5 | 4 | 2 | 2 | 5 | 5 | 5 | 3 | 4 | 4 |
| Example 13 | 10 | 4 | 2 | 3 | 2 | 1 | 1 | 2 | 3 | 2 | 1 | 3 | 1 |
| Example 16 | 10 | 5 | 4 | 3 | 1 | 2 | 1 | 5 | 5 | 4 | 4 | 1 | 1 |
|  | 20 | 3 | 2 | 5 | 2 | 2 | 2 | 5 | 2 | 2 | 2 | 2 | 1 |
| Example 18 | 10 | 3 | 2 | 5 | 2 | 2 | 2 | 4 | 2 | 2 | 2 | 2 | 1 |
|  | 5 | 3 | 2 | 4 | 1 | 2 | 1 | 3 | 1 | 1 | 1 | 1 | 1 |
|  | 20 | 4 | 3 | 5 | 4 | 2 | 1 | 4 | 4 | 4 | 1 | 1 | 1 |
| Example 27 | 10 | 3 | 2 | 3 | 3 | 2 | 1 | 4 | 2 | 1 | 1 | 1 | 1 |
|  | 5 | 3 | 1 | 3 | 1 | 1 | 1 | 1 | 1 | 2 | 1 | 2 | 1 |
| Example 28 | 20 | 2 | 2 | 5 | 2 | 2 | 2 | 4 | 2 | 1 | 2 | 2 | 1 |
|  | 10 | 2 | 2 | 5 | 2 | 1 | 2 | 4 | 2 | 1 | 2 | 2 | 1 |

The tests were carried out by spraying seedlings of various plant species with solutions prepared according to the process of Example 31 and observing the results 43 days after this treatment.

In Table I a numerical scale is used to show the herbicidal activity of the test compounds. On this scale, "1" indicates no injury to the plants; "2" indicates slight injury; "3" indicates moderate injury; "4" indicates severe injury; and "5" indicates that all of the plants were killed.

EXAMPLE 33

Separate lots of sterilized soil were inoculated with plant pathogens. The inoculated soil was placed in 4-ounce containers, and the soil in each container was drenched with 30 ml. of an aqueous suspension containing a fungicidal solution prepared by the process of Example 31. After incubation for two days at 70° F., the amount of mycelial growth on the surface of the soil was noted. The results of these tests are given in Table II. In this table, a rating of "1" indicates growth equal to that in inoculated soil that had not been treated with a fungicide; "2" indicates that about 75% of the surface was covered with colonies of the organism; "3" indicates that about half of the surface was covered with colonies of the organism; "4" indicates that a few scattered colonies were present; and "5" indicates that there was no growth on the surface of the soil.

TABLE III.—ACTIVITY OF 1,5-SUBSTITUTED INDAZOLES AS FOLIAR FUNGICIDES

| Fungicide, product of— | Rate (p.p.m.) | Percent control of— | |
|---|---|---|---|
| | | Early blight of tomatoes | Late blight of tomatoes |
| Example 3 | 1,000 | 80 | |
| Example 4 | 1,000 | | 90 |
| | 500 | | 87 |
| | 250 | | 61 |
| Example 10 | 1,000 | | 100 |
| | 500 | | 100 |
| | 250 | | 99 |
| | 125 | | 83 |
| | 60 | | 42 |
| Example 15 | 1,000 | | 47 |
| Example 18 | 1,000 | 91 | |
| | 500 | 91 | |
| | 100 | 70 | |
| Example 19 | 1,000 | | 100 |
| | 500 | | 100 |
| | 250 | | 98 |
| | 125 | | 97 |
| | 60 | | 86 |
| Example 22 | 1,000 | 100 | 94 |
| | 500 | 87 | 64 |
| Example 24 | 1,000 | 100 | |
| | 500 | 94 | |
| Example 25 | 1,000 | 100 | 100 |
| | 100 | 97 | 55 |
| | 20 | 94 | |
| | 4 | 65 | |
| Example 26 | 1,000 | 93 | |
| | 500 | 85 | |
| | 100 | 74 | |
| | 20 | 64 | |
| Example 29 | 1,000 | 63 | |
| Example 30 | 1,000 | 100 | |
| | 500 | 85 | |

TABLE II.—ACTIVITY OF 1,5-SUBSTITUTED INDAZOLES AS SOIL FUNGICIDES

| Fungicide, product of— | Rate (lbs./acre) | Plant pathogen | | | |
|---|---|---|---|---|---|
| | | Sclerotium rolfsii | Pythium sp. | Rhizoctonia solani | Fusarium oxysporum |
| Example 6 | 300 | 5 | 5 | 3 | 3 |
| Example 7 | 300 | 5 | 4 | 2 | 1 |
| Example 8 | 300 | 5 | 4 | 5 | 5 |
| Example 9 | 300 | 5 | 5 | 5 | 5 |
| | 150 | 2 | 3 | 2 | 1 |
| Example 13 | 300 | 5 | 4 | 4 | 2 |
| Example 18 | 300 | 5 | 4 | 3 | 1 |
| | 300 | 5 | 5 | 5 | 5 |
| Example 22 | 300 | 5 | 5 | 5 | 5 |
| | 150 | 1 | 2 | 1 | 2 |
| Example 25 | 300 | 3 | 3 | 3 | 2 |
| Example 27 | 300 | 4 | 3 | 3 | 4 |

EXAMPLE 34

Tomato plants that were 6–8 inches tall were sprayed until the liquid dripped from the leaves with aqueous solutions prepared by the procedure of Example 31. When the plants had dried, they were sprayed with suspensions of the spores of tomato early blight or late blight fungus. One week after treatment, the degree of suppression of the The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:
1. A compound having the structural formula

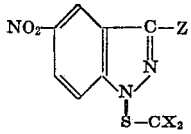

wherein X represents halogen and Z represents hydrogen or halogen.

2. A compound as set forth in claim 1 wherein X is chlorine and Z is hydrogen.
3. A compound as set forth in claim 1 wherein X is chlorine and Z is chlorine.
4. An indazole of the formula

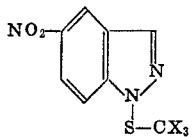

wherein X is halogen of atomic number from 17 to 35.

5. The indazole of the formula

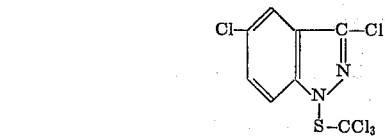

References Cited

UNITED STATES PATENTS

| | | | |
|---|---|---|---|
| 2,553,770 | 5/1951 | Kittleson | 260—309.5 |
| 2,553,775 | 5/1951 | Hawley et al. | 260—309.5 |
| 2,844,628 | 7/1958 | Kuhle et al. | 424—273 |
| 2,888,462 | 5/1959 | Cannon | 260—310R |
| 3,178,447 | 4/1965 | Kohn | 260—309.5 |

OTHER REFERENCES

Schlager Chem. Abst., vol. 61, column 700, 3 (1964), QD1.A51.

NATALIE TROUSOF, Primary Examiner

U.S. Cl. X.R.

71—82; 260—293 D; 424—267, 273

UNITED STATES PATENT OFFICE
CERTIFICATE OF CORRECTION

Patent No. 3,641,050     Dated Feb. 8, 1972

Inventor(s) Pasquale P. Minieri

It is certified that error appears in the above-identified patent and that said Letters Patent are hereby corrected as shown below:

Column 1, lines 66 and 67, delete $-\overset{\overset{O}{\|}}{P}=(OR)_2$, first occurrence.

Column 5, line 58, change "Pythium" to -- Pythium --.

Signed and sealed this 30th day of April 1974.

(SEAL)
Attest:

EDWARD M. FLETCHER, JR.
Attesting Officer

C. MARSHALL DANN
Commissioner of Patents